(12) United States Patent
Balkoski et al.

(10) Patent No.: US 12,450,872 B2
(45) Date of Patent: Oct. 21, 2025

(54) MACHINE LEARNING TECHNIQUES FOR GROUND CLASSIFICATION

(71) Applicant: Matterport, Inc., Sunnyvale, CA (US)

(72) Inventors: Kevin Balkoski, San Mateo, CA (US); Edward Melcher, Toronto (CA); Eleanor Crane, Sunnyvale, CA (US); Matthieu Francois Perrinel, Berkeley, CA (US)

(73) Assignee: CoStar Realty Information, Inc., Arlington, VA (US)

( * ) Notice: Subject to any disclaimer, the term of this patent is extended or adjusted under 35 U.S.C. 154(b) by 341 days.

(21) Appl. No.: 17/938,547

(22) Filed: Oct. 6, 2022

(65) Prior Publication Data

US 2023/0104674 A1   Apr. 6, 2023

Related U.S. Application Data

(60) Provisional application No. 63/252,873, filed on Oct. 6, 2021.

(51) Int. Cl.
| | | |
|---|---|---|
| *G06V 10/764* | (2022.01) |
| *G01S 17/89* | (2020.01) |
| *G06V 10/26* | (2022.01) |
| *G06V 10/40* | (2022.01) |
| *G06V 10/774* | (2022.01) |
| *G06V 20/17* | (2022.01) |

(52) U.S. Cl.
CPC ............ *G06V 10/764* (2022.01); *G01S 17/89* (2013.01); *G06V 10/267* (2022.01); *G06V 10/40* (2022.01); *G06V 10/774* (2022.01); *G06V 20/17* (2022.01)

(58) Field of Classification Search
CPC . G06V 10/764–765; G06V 20/10–182; G06V 10/26–273; G01S 17/88–90
See application file for complete search history.

(56) References Cited

U.S. PATENT DOCUMENTS

| | | | |
|---|---|---|---|
| 2015/0170526 A1* | 6/2015 | Wang ..................... G08G 5/54 701/16 |
| 2016/0154999 A1* | 6/2016 | Fan ........................ G06T 7/155 382/103 |
| 2019/0188602 A1* | 6/2019 | Kwant ..................... G06N 3/08 |

OTHER PUBLICATIONS

Aerial point cloud classification with deep learning and machine learning algorithms, Äzdemir et al.(Year: 2019).*

(Continued)

*Primary Examiner* — David Ometz
(74) *Attorney, Agent, or Firm* — Ahmann Kloke LLP

(57) ABSTRACT

Example systems, methods, and non-transitory computer readable media are directed to obtaining a point cloud that represents an environment based at least in part on a plurality of points in three-dimensional space; determining corresponding classifications of points in the point cloud as ground or not-ground based at least in part on a plurality of ground classification algorithms; determining respective point cloud features associated with the points in the point cloud; determining respective cell features associated with a plurality of cells that segment the point cloud; generating feature data for a machine learning model based at least in part on one or more of: the classifications of the points based on the plurality of ground classification algorithms, the point cloud features, or the cell features; and classifying the points in the point cloud based at least in part on an output from the machine learning model.

20 Claims, 16 Drawing Sheets

(56) References Cited

OTHER PUBLICATIONS

An Improved Morphological Algorithm for Filtering Airborne LiDAR Point Cloud Based on Multi-Level Kriging Interpolation, Hui et al (Year: 2016).*

Classification of LiDAR Point Cloud based on Multiscale Features and PointNet, Zhongyang et al (Year: 2018).*

Gastellu-Etchegorry, Jean-Philippe, et al., 2015. "Discrete Anisotropic Radiative Transfer (DART 5) for Modeling Airborne and Satellite Spectroradiometer and LIDAR Acquisitions of Natural and Urban Landscapes" Remote Sensing 7, No. 2: 1667-1701. https://doi.org/10.3390/rs70201667.

Guilherme Gusmão, et al., 2019, A LiDAR system simulator based on raytracing, modeled with metrological parameters and environmental noise. 11-12. 10.5753/svr_estendido.2019.8453.

Kegi Zhang, Shu-Ching Chen, Dean Whitman, Mei-Ling Shyu, Jianhua Yan, Chengcui Zhang, 2003, A progressive morphological filter for removing nonground measurements from airborne LIDAR data. Geoscience and Remote Sensing, IEEE Transactions on. 41. 872-882. 10.1109/TGRS.2003.810682.

Steven Hancock et al., Exploring the Measurement of Forests With Full Waveform LiDAR Through Monte-Carlo Ray Tracing , The International Archives of the Photogrammetry, Remote Sensing and Spatial Information Sciences. vol. 37, Part B1, Beijing 2008, pp. 235-239.

Thomas Pingel, Keith Clarke, William McBride, 2013, An Improved Simple Morphological Filter for the Terrain Classification of Airborne LIDAR Data. ISPRS Journal of Photogrammetry and Remote Sensing. 77. 21-30. 10.1016/j.isprsjprs.2012.12.002.

Zhang, W.; Qi, J.; Wan, P.; Wang, H.; Xie, D.; Wang, X.; Yan, G. An Easy-to-Use Airborne LiDAR Data Filtering Method Based on Cloth Simulation. Remote Sens. 2016, 8, 501. https://doi.org/10.3390/rs8060501.

* cited by examiner

| | Median AGL SMRF flat | Median AGL SMRF hilly | ... | Standard Dev. zenith angle | Median Intensity | Median Red | ... | Regional Height R=20m | Regional Depth R=20m |
|---|---|---|---|---|---|---|---|---|---|
| Cell 1 | 0 | 0 | | 0.01 | 0.8 | 128 | | 3 | 8 |
| Cell 1 | 0.5 | 0.1 | | 0.1 | 0.8 | 212 | | 5 | 12 |
| ... | | | | | | | | | |
| Cell N | 10 | 12 | | .4 | 0.4 | 101 | | 20 | 2 |

FIG. 6

Example Formatting of Features as Tabular Data

Example of Tabular Output (per cell)

| Point | Cell | Probability/Confidence |
|---|---|---|
| 1 | 1 | 85% |
| 2 | 1 | 90% |
| 3 | 1 | 89% |
| 4 | 2 | 59% |
| 5 | 2 | 60% |
| ... | | |
| M-2 | N | 20% |
| M-1 | N | 42% |
| M | N | 30% |

Example of Tabular Output (per point)

MACHINE LEARNING TECHNIQUES FOR GROUND CLASSIFICATION

CROSS-REFERENCE TO RELATED APPLICATION

The present patent application claims priority from, and is a non-provisional application of, U.S. Provisional Patent Application No. 63/252,873, entitled "Applying Multiple Algorithms to Determine Ground from a 3D Point Cloud," filed Oct. 6, 2021, which is incorporated by reference herein.

FIELD OF THE INVENTION(S)

Embodiments of the present inventions relate generally to training and applying improved machine learning models for classifying ground points in point cloud data.

BACKGROUND

Light Detection and Ranging (LiDAR) technology is often applied to create high-resolution point clouds that represent an environment. Each point cloud comprises a collection of points in 3D space. The environment may be an outdoor environment or a building interior.

In one example, where the environment is an outdoor environment, the LiDAR unit may be a part of an airborne system that generates three-dimensional data representing a geographic environment from an aerial perspective. The LiDAR unit may be used to generate measurements (or samples) of the geographic environment. The measurements may each represent a three-dimensional data point, which together form a point cloud representation of the geographic environment. Each three-dimensional data point can be associated with spatial coordinates among other information, such as color, intensity, and return number.

The point cloud may be used to create a virtual representation of the environment. For example, the virtual representation may be a 3D virtual model or a digital elevation model (DEM) that can be used for navigation and analysis.

SUMMARY

Example systems, methods, and non-transitory computer readable media are directed to obtaining a point cloud that represents an environment based at least in part on a plurality of points in three-dimensional space; determining corresponding classifications of points in the point cloud as ground or not-ground based at least in part on a plurality of ground classification algorithms; determining respective point cloud features associated with the points in the point cloud; determining respective cell features associated with a plurality of cells that segment the point cloud; generating feature data for a machine learning model based at least in part on one or more of: the classifications of the points based on the plurality of ground classification algorithms, the point cloud features, or the cell features; and classifying the points in the point cloud based at least in part on an output from the machine learning model in response to input of the feature data.

According to some embodiments, when determining the respective point cloud features, attributes for each point may be determined, the attributes including at least one of: coordinates of the point in three-dimensional space, a color associated with the point, an intensity associated with the point, or an estimated above ground level (AGL) associated with the point.

According to some embodiments, the output from the machine learning model further includes respective ground classification probabilities for the points in the point cloud, wherein a ground classification probability for a point represents a likelihood of that point corresponding to a ground level in the environment.

According to some embodiments, the plurality of points in three-dimensional space is determined by a sensor device.

According to some embodiments, determining the respective cell features associated with the plurality of cells includes dividing the point cloud into a two-dimensional grid of cells along horizontal X and Y dimensions, wherein a cell corresponds to a portion of the environment as represented by the point cloud; and determining one or more attributes for each cell, wherein the one or more attributes are representative of points included in the cell.

According to some embodiments, the attributes determined for the cell include one or more of: a minimum z value of a point in the cell or a maximum z value of a point in the cell; a minimum, maximum, or median AGL associated with points included in the cell; a standard deviation of AGL associated with points included in the cell; a minimum, maximum, or median intensity of points included in the cell; a minimum, maximum, or median curvature associated with points included in the cell; a minimum, maximum, or median red, green, blue (RGB) values associated with points included in the cell; a minimum, maximum, or median normalized different vegetation index (NDVI); a minimum, maximum, median, or standard deviation of zenith angle (or slope) associated with points included in the cell; a minimum, maximum, or median SMRF estimated AGL; a standard deviation of normals; a minimum, maximum, or median interquartile range (IQR) of vertical z coordinates, or a combination thereof.

According to some embodiments, the systems, methods, and non-transitory computer readable media are further directed to determining respective regional features associated with a plurality of regions of cells that represent the environment, wherein a region of cells comprises a plurality of cells.

According to some embodiments, determining the respective regional features associated with the plurality of regions of cells that represent the environment includes grouping cells in the plurality of cells into the plurality of regions of cells; and determining one or more attributes for each region of cells, wherein the one or more attributes are representative of a plurality of cells and points included in the region of cells.

According to some embodiments, the attributes determined for the region of cells include one or more of: a height in radius R associated with the region of cells; a depth in radius R associated with the region of cells; a Z entropy in radius R associated with the region of cells; a minimum height of cell below minimum height in some radius; an intensity entropy in the region of cells, a slope of a cell in the region of cells that is above a median slope of the point cloud, or a combination thereof.

According to some embodiments, generating the set of machine learning features includes: formatting the feature data for ingestion by the machine learning model.

Example systems, methods, and non-transitory computer readable media are directed to obtaining a point cloud that represents an environment based at least in part on a plurality of points in three-dimensional space; determining corresponding classifications of points in the point cloud as ground or not-ground based at least in part on a plurality of ground classification algorithms; determining respective point cloud features associated with the points in the point cloud; determining respective cell features associated with a plurality of cells that segment the point cloud; generating feature data for a machine learning model based at least in part on one or more of: the classifications of the points based on the plurality of ground classification algorithms, the point cloud features, or the cell features; and training the machine learning model based at least in part on the feature data.

According to some embodiments, the plurality of points in three-dimensional space is determined by a sensor device.

According to some embodiments, the feature data further comprises ground truth information for the points in the point cloud, wherein the ground truth information correctly classifies the points in the point cloud as ground or not-ground.

According to some embodiments, the systems, methods, and non-transitory computer readable media are further directed to storing the feature data as a training example in a training data repository.

According to some embodiments, the systems, methods, and non-transitory computer readable media are further directed to determining respective regional features associated with a plurality of regions of cells that represent the environment, wherein a region of cells comprises a plurality of cells.

BRIEF DESCRIPTION OF THE DRAWINGS

FIG. 6 depicts an example tabular format of features according to some embodiments.

DETAILED DESCRIPTION

In some embodiments a virtual representation generated using a point cloud may be a 3D virtual model or a digital elevation model (DEM) that can be used for navigation and analysis. However, before an accurate virtual representation of the geographic environment can be created, the point cloud must be classified so that points that correspond to a ground level are distinguished from points that correspond to an above-ground level.

Figure 1A:
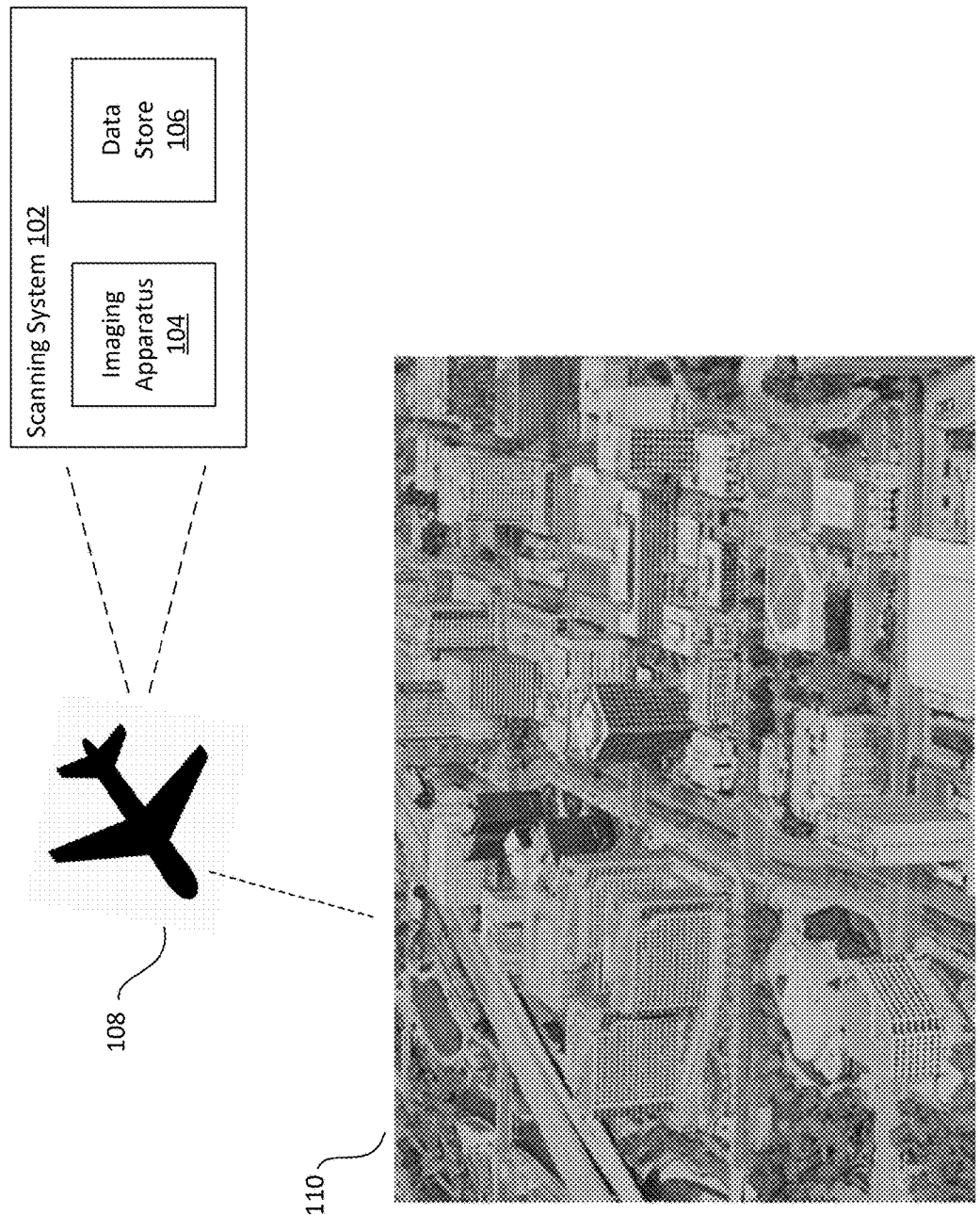
FIG. 1A depicts an example scanning system for determining three-dimensional point cloud representations of geographic environments.

FIG. 1A illustrates an example scanning system 102 (e.g., an airborne laser system (ALS)) that includes an imaging apparatus 104 and a data store 106. The scanning system 102 can be implemented in an airborne vehicle 108. The imaging apparatus 104 may be an aerial laser scanning (ALS) device, a camera, LiDAR, or any other device that can generate point clouds of three-dimensional environments. For example, the imaging apparatus 104 may be a LiDAR unit that is configured to emit pulses of light. The imaging apparatus 104 may be mounted in the airborne vehicle 108 so that the pulses of light emitted from the LiDAR unit are directed to a geographic environment 110 in a scanning pattern. The imaging apparatus 104 can determine measurements (or points) of the geographic environment 110 based on captured returns of the emitted pulses of light. The measurements together form a three-dimensional (3D) point cloud representation of the geographic environment 110, which can be stored in the data store 106 for later processing.

As mentioned, the point cloud representation may be used to create a virtual representation, such as a digital elevation model (DEM), of the geographic environment 110. However, before an accurate virtual representation of the geographic environment 110 can be generated, the point cloud representation may be classified so that points that correspond to a ground level are distinguished from points that correspond to an above-ground level.

There are many conventional ground classification algorithms for classifying points in a point cloud. One example of a ground classification algorithm is a Progressive Morphological Filter (PMF). The PMF may identify ground data by gradually increasing a window size of a filter and using elevation difference thresholds to remove non-ground data (e.g., remove measurements of vehicles, vegetation, and buildings). The PMF may identify terrain and building measurements. In one example, an initial filtered surface is derived by applying an opening operation with a window of length L1 to the raw data. The large non-ground features such as buildings are preserved because their sizes are larger than L1, while objects (e.g., individual trees) of size smaller than L1 are removed. For terrain, features smaller than L1 are cut off and replaced by the minimum elevation within L1. In the next iteration, the window size is increased to L2 and another opening operation is applied to the filtered surface. Building measurements are removed and replaced by the minimum elevation of previous filtered surface within L2. By performing the operation to the point cloud with a window that increases in size gradually, the Progressive Morphological Filter can remove buildings and vegetation at various sizes to identify ground. One example approach for performing the PMF algorithm is described in "A Progressive Morphological Filter for Removing Nonground Measurements From Airborne LIDAR Data", IEEE Transactions on Geoscience and Remote Sensing, Vol. 41, No. 4 (April 2003), the disclosure of which is incorporated by reference in its entirety.

Another example of a ground classification algorithm is a Simple Morphological Filter (SMRF), which applies image processing techniques to data using a linearly increasing window and slope thresholding to identify ground data in four conceptional stages. For example, in the first stage, the minimum surface is created. In the second stage, the minimum surface is processed in which grid cells from the raster are identified as either containing bare earth (BE) or objects (OBJ). In the third step, a Digital Elevation Model (DEM)

is created from the gridded points. In the fourth stage, the original LiDAR points are identified as either bare earth or objects based on their relationship to the interpolated DEM. One example approach for performing the SMRF algorithm is described in "An Improved Simple Morphological Filter for the Terrain Classification of Airborne LIDAR Data", ISPRS Journal of Photogrammetry and Remote Sensing (2013), the disclosure of which is incorporated by reference in its entirety.

A different ground classification algorithm is the Progressive Triangulated Irregular Network (TIN) filtering method, which is an iterative process that includes three steps: (1) searching for initial seed points in preset grids, (2) constructing TIN using points in a seed-point set, and (3) densification for the seed-point set. If no new point has been added into the seed-point set, iteration immediately terminates. If a new point has been added, then the method returns to step 2 and continues processing. One example approach for performing the Progressive TIN algorithm is described in "Improved progressive triangular irregular network densification filtering algorithm for airborne LiDAR data based on a multiscale cylindrical neighborhood", Applied Optics, Vol. 59, Issue. 22 (2020), the disclosure of which is incorporated by reference in its entirety.

In yet another example of a ground classification algorithm, a Cloth Simulation Filter (CSF) is a filtering method based on cloth simulation. The CSF attempts to simulate interactions between cloth nodes and corresponding points in a point cloud, where locations of the cloth nodes can be determined to generate an approximation of a ground surface. Then, the ground points can be extracted from the point cloud by comparing the original points and the approximated ground surface. One example approach for performing the CSF algorithm is described in "An Easy-to-Use Airborne LiDAR Data Filtering Method Based on Cloth Simulation," MDPI Remote Sensing Journal (2016), the disclosure of which is incorporated by reference in its entirety.

Each conventional techniques come with limitations that can reduce ground classification accuracy. For instance, methods such as PMF, SMRF, Progressive TIN, and CSF are each often suited to work best for specific types of terrains and under specific conditions (e.g., PMF may provide better accuracy for a particular terrain type over SMRF, but SMRF may provide better accuracy over PMF for a different terrain type). Since each algorithm is designed to work well with specific terrains, the types of terrain represented in a point cloud must be known in advance so that an optimal ground classification technique can be selected and applied.

Further, each technique has a considerable number of parameters that must be carefully tuned by a trained user to optimize ground classification for each point cloud. For instance, one set of SMRF parameters may be used if a point cloud represents a hilly terrain while another set of SMRF parameters may be used if the point cloud represents flat terrain. Given the variations in terrain that may be present in any given geographic area, it can be difficult to correctly choose a ground classification algorithm and related parameters that are best suited to predict ground. In some instances, selection of a ground classification algorithm and related parameters may need to be refined over multiple iterations to effectively classify ground points and non-ground points. Further, modern ground classifiers that rely on 3D deep learning models often do not generalize well to unfamiliar data without substantial training and computational costs.

Another limitation is that existing ground classification techniques generally do not consider any information beyond spatial information, which can significantly reduce ground classification accuracy. For instance, intensity levels associated with points—which can help improve classification accuracy—are ignored by existing ground classification techniques.

Further, outputs from existing ground classification techniques are typically limited. For example, most ground classification techniques merely provide a binary classification, where each point is simply classified as ground or not ground. For purposes of reconstructing an accurate virtual representation of a geographic region, however, it would be advantageous if such techniques also provided ground classification probabilities reflecting how likely a given point corresponds to ground.

Figure 1B:
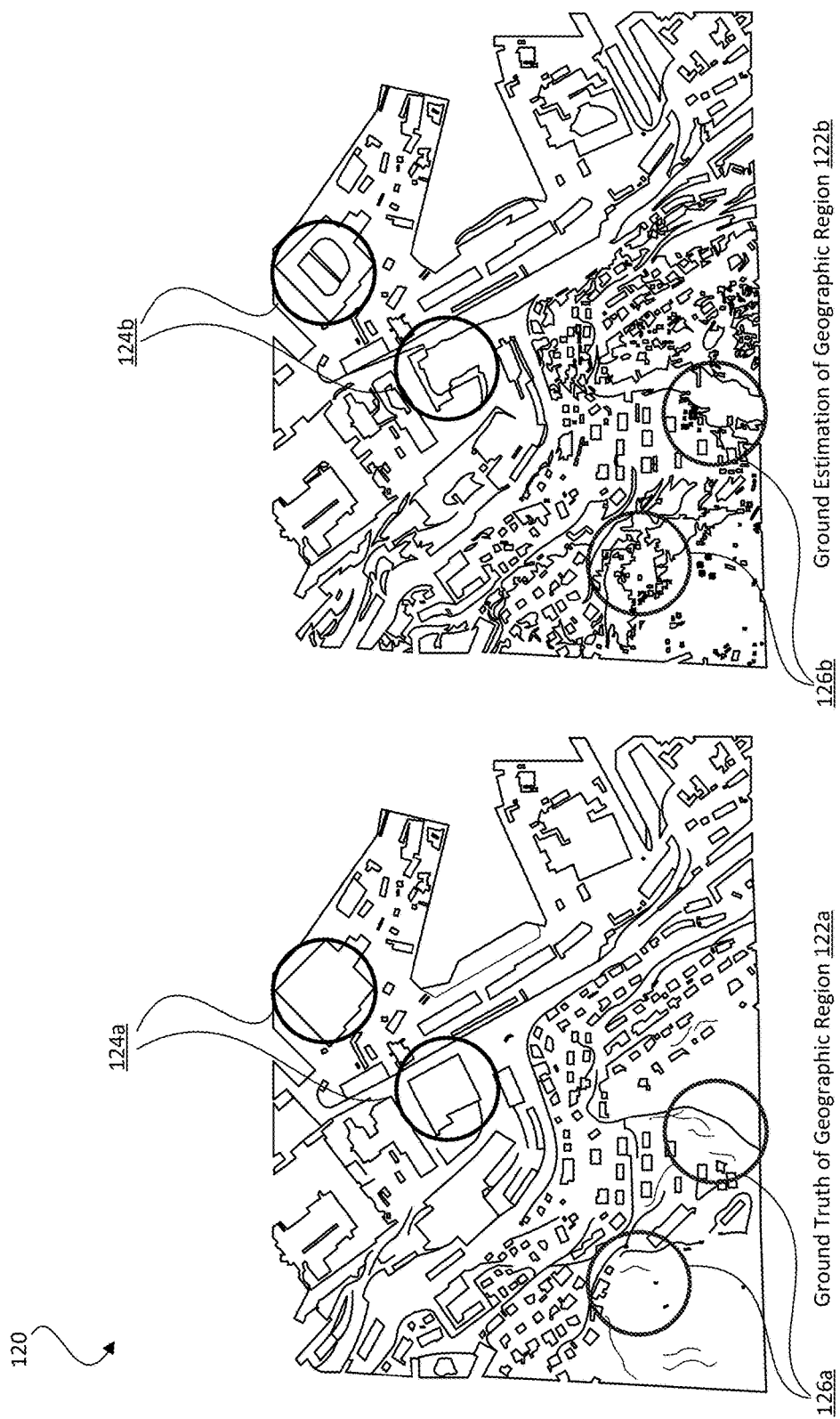
FIG. 1B depicts example scenarios that pose challenges for existing ground classification techniques.

The limitations associated with existing ground classification algorithms, especially the need to tailor algorithms and related parameters to specific terrains, can increase the risk of false positives and false negatives. For example, FIG. 1B illustrates an example comparison 120 between a ground truth 122a representation of a geographic region in which ground points are known and a processed version 122b of the geographic region in which points have been classified as ground by a generally known ground classification algorithm (i.e., CSF). As illustrated in the example comparison 120, the ground classification algorithm resulted in false positives of ground 124b in locations with exceptionally large buildings 124a, such as data centers. In another example, the ground classification algorithm resulted in false negatives of ground 126b in locations with steep slopes 126a, such as hilly terrain.

Given the many limitations associated with conventional ground classification algorithms, there exists a need for solution that can automatically analyze a point cloud to classify ground points, regardless of the types of terrains that may be represented, without requiring manual selection of ground classification algorithms and parameters. In various embodiments, systems and methods discussed herein improve scalability of pre-existing systems and improve accuracy. As such, various embodiments discussed herein correct limitations and errors caused by technology (i.e., the poor fit of previous models to different types of terrain that leads to inaccuracies).

Various embodiments described herein provide a claimed solution rooted in computer technology that solves a problem arising in the realm of computer technology. In various embodiments, a robust machine learning model can be trained to determine ground points in point clouds more accurately that conventional ground classification techniques. The machine learning model can be trained based on a number of features, including ground classification results from conventional ground classification algorithms (e.g., PMF, SMRF, Progressive TIN, CSF), point cloud features, derived features, and contextual features, to name some examples. Once trained, the machine learning model can be provided point cloud data as input. Upon processing the point cloud data, the machine learning model can output, for each point, a likelihood of that point corresponding to a ground level (or floor) of terrain represented by the point cloud data. Many variations are possible. Thus, the embodiments described herein are capable of classifying ground points in an unstructured point cloud that is generally terrain agnostic while only requiring relatively small amounts of training data. Advantageously, the embodiments help minimize or reduce false positives (i.e., improving accuracy), especially those that appear in relation to large buildings.

Further, the embodiments described herein are capable of classifying point clouds faster than conventional ground classification algorithms without requiring individualized tuning of parameters (e.g., improving scale and speed).

Figure 2A:
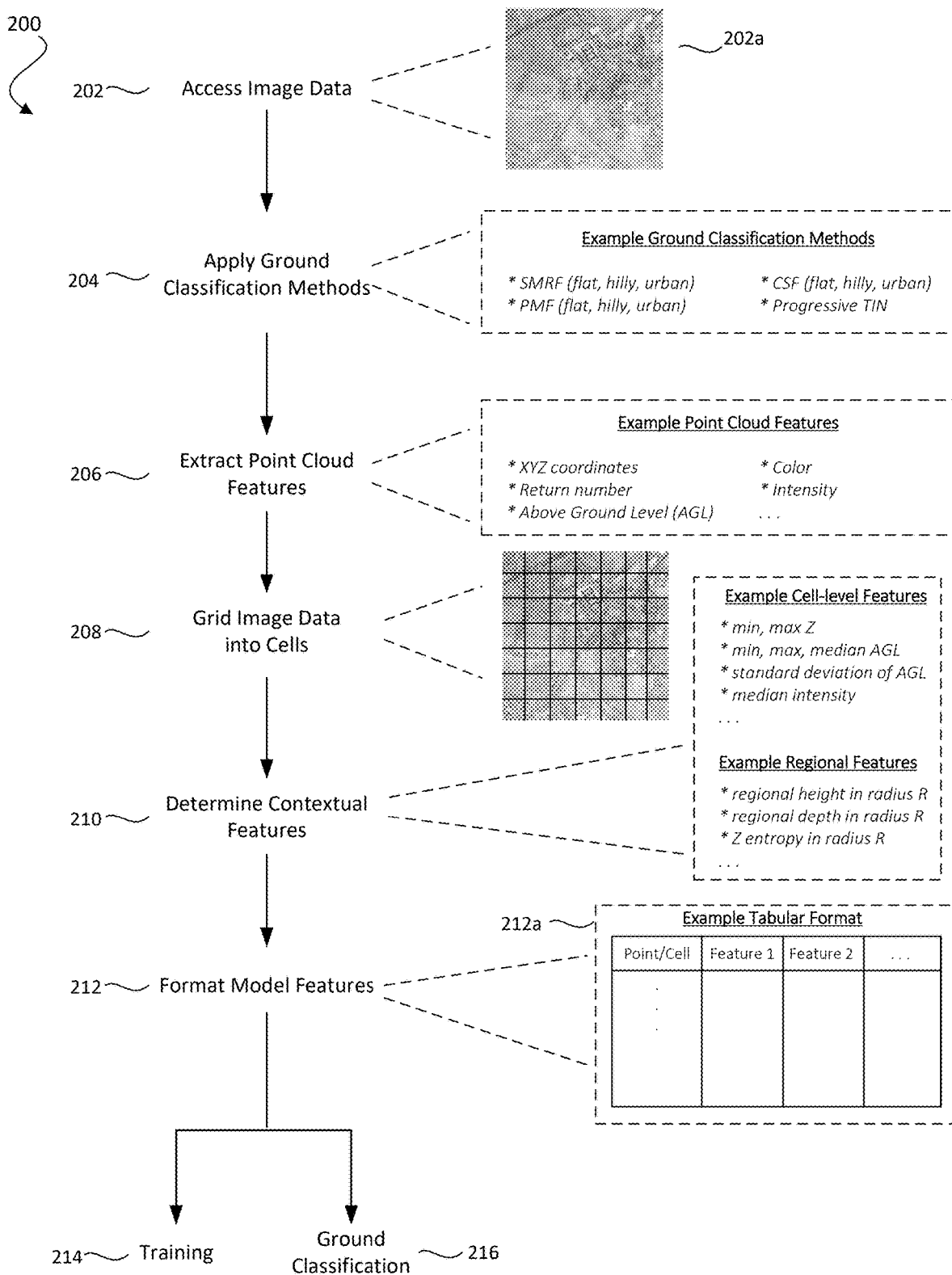
FIG. 2A depicts an example process for ground classification according to some embodiments.

FIG. 2A depicts an example process 200 for preparing point cloud data for ingestion by a machine learning model, according to some embodiments. For example, the machine learning model can be configured to receive point cloud data as input and provide classification probabilities of individual points as being ground or not ground.

In step 202, image data 202a representing a three-dimensional point cloud is obtained. For example, the image data 202a may be obtained from system (e.g., the scanning system 102) or a sensor (e.g., the imaging apparatus 104). In various embodiments, the image data 202 may be received or retrieved from any number of image sources (e.g., third-party systems that generate images and/or measurement information from satellites, airplanes, cameras, LiDAR devices, and/or the like). In some embodiments, the images and/or measurements include metadata that identifies the location where information was obtained, identifies the service (e.g., name of provider) that provided the information, and/or identifies equipment (e.g., model, camera type, satellite type, and/or the like).

In step 204, one or more conventional ground classification algorithms are applied to the image data 202a. These ground classification algorithms may include, but are not limited to, the Simple Morphological Filter (SMRF), Progressive Morphological Filter (PMF), Progressive Triangular Irregular Network (TIN), and/or Cloth Simulation Filter (CSF). In some embodiments, each ground classification algorithm can be run multiple times with different sets of parameters that are optimized for specific types of terrains, such as flat terrain, hilly terrain, and urban terrain. In general, each ground classification algorithm determines a binary classification for every point in the point cloud. For each ground classification algorithm, one or more sets of parameters may be selected in order to achieve a high variance in classifications between points in the point cloud. For example, the parameters may be selected so that the different ground classification algorithms generally only work well in isolation for a subset of conditions. Many variations are possible.

In step 206, point cloud features can be extracted from the image data 202a. In some embodiments, for each point in the point cloud, corresponding point attributes are determined including, for example, three-dimensional Cartesian coordinates, color, intensity, and return number. In some embodiments, for each ground classification algorithm applied in step 204, an estimated above ground level (AGL) is calculated for every point in the 3D point cloud. For example, the AGL for a point may be calculated as its vertical distance relative to its nearest group of points that have been classified as ground points. Other values may be derived from the point cloud for use as features, such as curvature and slope.

In step 208, the image data 202a may be divided into a grid of cells. For example, the point cloud represented in the image data 202a may be broken up into smaller two-dimensional cells along the horizontal X and Y dimensions. In one example, the point cloud may be divided into a grid of evenly spaced rectangular cells in the X and Y (e.g., easting and northing) dimensions. For example, in some embodiments, each cell may be 1×1 meter and the cells may be arranged in a 1000 by 1000 grid covering 1 square kilometer. Other approaches for dividing the point cloud are contemplated. For example, the point cloud may be divided into an unstructured grid of varying cell sizes and/or shapes. The size and shape of each individual cell could be determined, for example, by its local attributes or through a clustering algorithm.

In step 210, contextual features are determined based on the grid of cells corresponding to the image data 202a. For example, contextual features can include cell-level features that represent attributes of a given cell in the grid of cells. Examples of cell-level features may include a minimum z value of a point in the cell and a maximum z value of a point in the cell. Contextual features may also include regional features that are determined for groups of cells in the grid of cells. For example, cells may be grouped into regions of cells for further context of the types of terrains that are represented across a larger geographic area. In one example, a region may represent a 3×3 grid of cells. Examples of regional features that may be determined include a height in radius R associated with the region of cells and a depth in radius R associated with the region of cells. Many variations are possible.

In step 212, the information determined in steps 204-210 is formatted so it can be ingested by the machine learning model. In various embodiments, the information can be formatted for compatibility with any generally known machine learning model type. For example, if the machine learning model is a convolutional neural network (CNN), the information may be formatted as an image with a channel for each feature. In another example, if the machine learning model is a regression model, the information may be formatted in a tabular format 212a. Many variations are possible.

Once the information describing the point cloud has been formatted for the machine learning model, the information may be used as a training example for training 214 the machine learning model or provided as input to an already trained machine learning model to determine ground classifications 216.

Figure 2B:
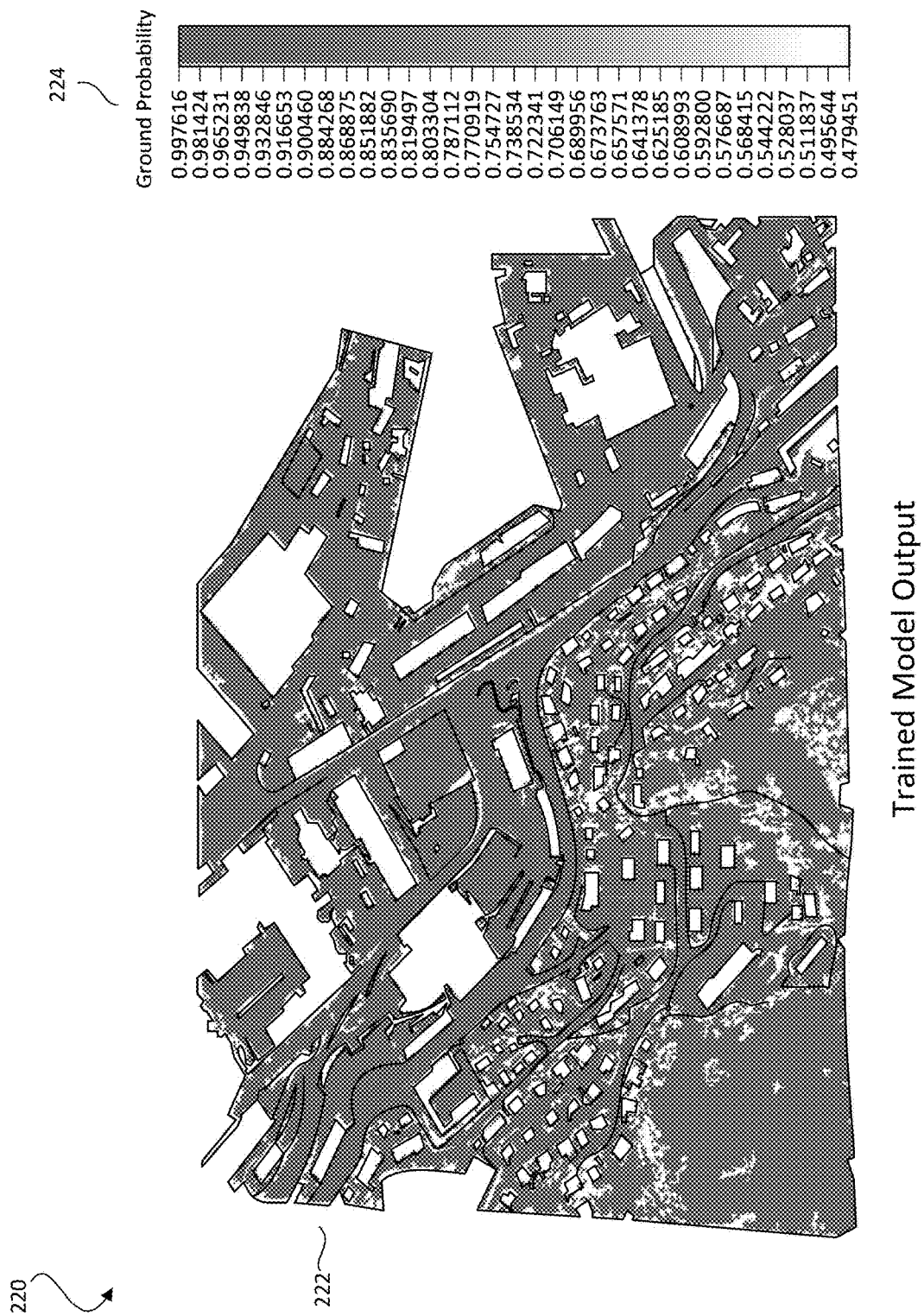
FIGS. 2B-2C depict example classification results from the ground classification process described in reference to FIG. 2A.

FIG. 2B illustrates example ground classification results 220 from a machine learning model trained according to the embodiments described herein. The ground classification results 220 can provide respective ground classifications for each point representing a geographic region 222. The ground classifications can be used to visually segment the geographic region 222 between ground and non-ground points. The ground classification results 220 can also provide a list of probabilities 224 associated with the ground classifications. The list 224 can provide a respective probability for each point indicating a likelihood (or confidence) of that point corresponding to ground. Many variations are possible.

Figure 2C:
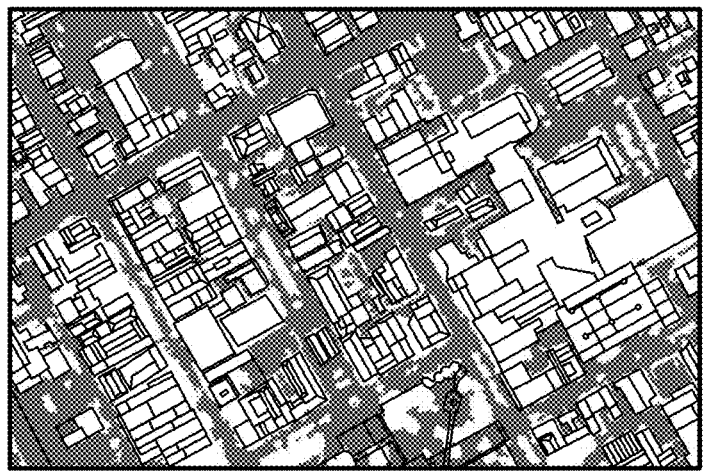
Figure 2C:
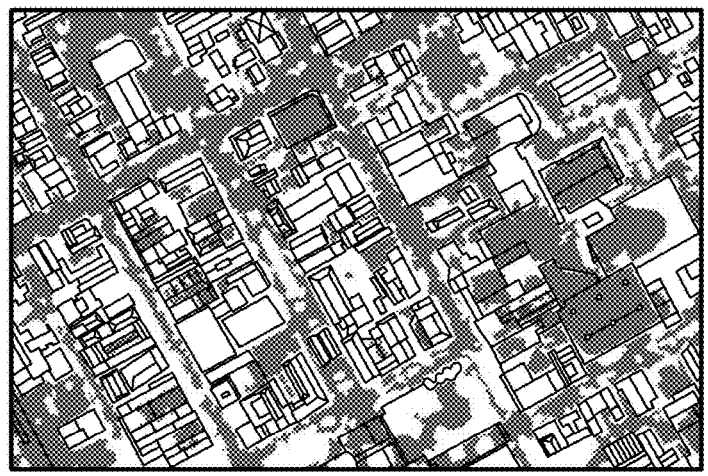
Figure 2C:
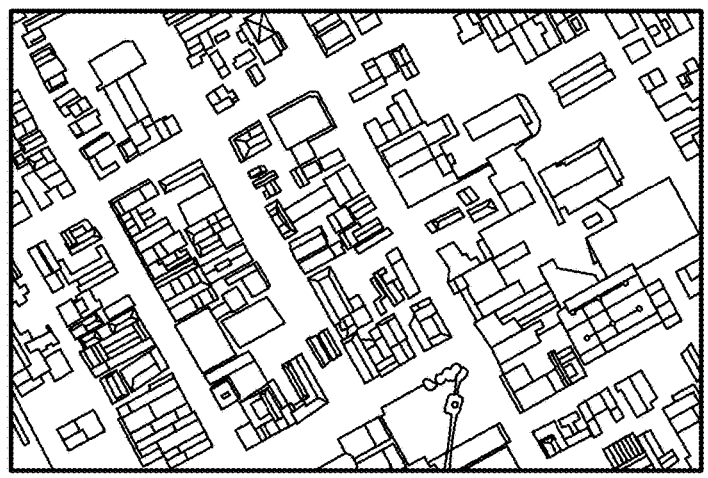

FIG. 2C illustrates example ground classifications 230 for a geographic region. In FIG. 2C, a ground truth classification 232 of points representing the geographic region is provided. FIG. 2C also illustrates a comparison between ground classifications 234 determined by a conventional SMRF ground classification algorithm and higher accuracy ground classifications 236 determined by a machine learning model that has been trained according to some embodiments described herein. The ground classifications 236 determined by the machine learning model are more accurate regardless of the types of terrain that is represented in the geographic region. As shown, the ground classifications 236 determined by the machine learning model more closely correspond to the ground truth classification 232 than the less accurate ground classifications 234 determined by the conventional SMRF ground classification algorithm.

Figure 3:
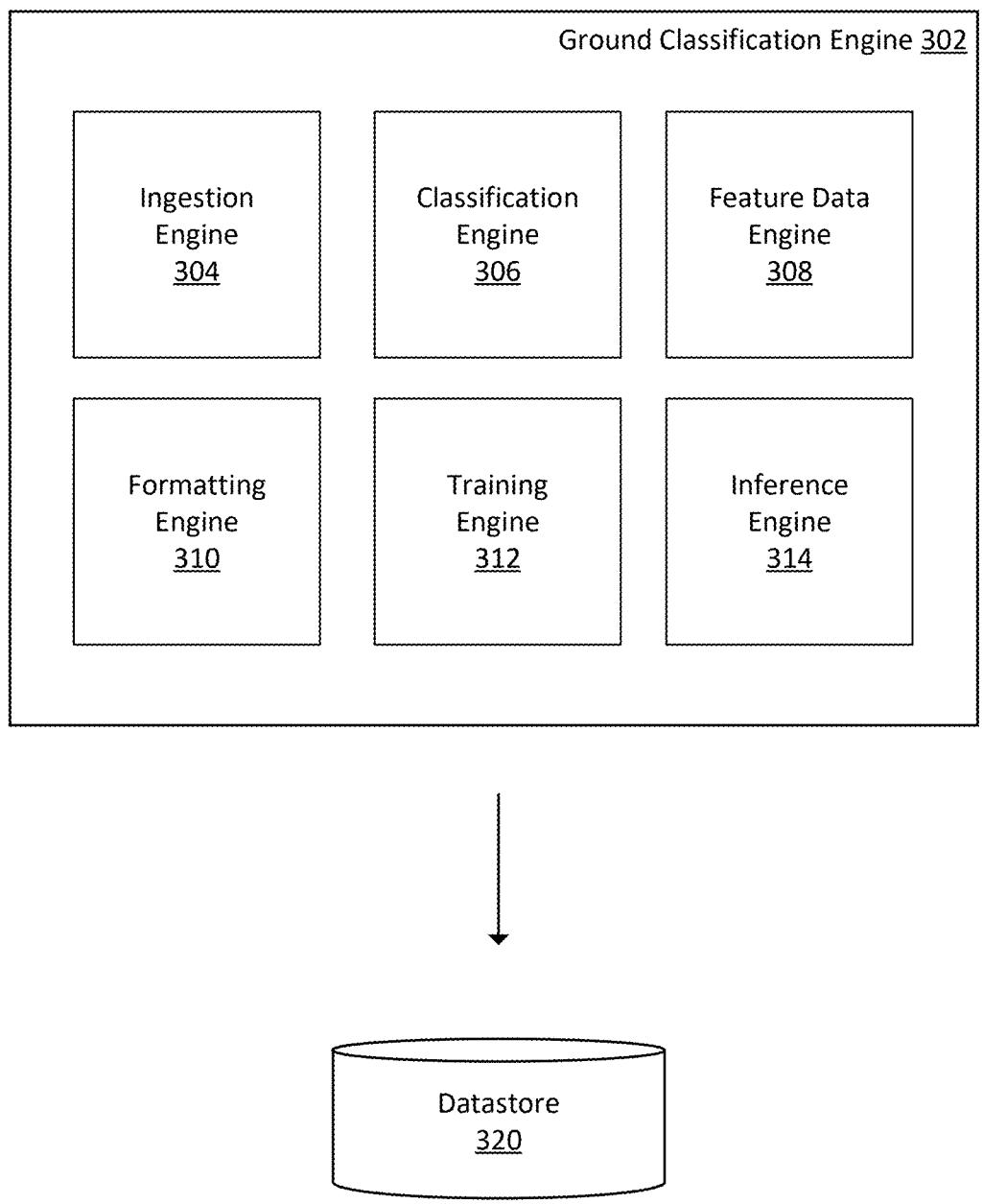
FIG. 3 depicts a block diagram of components of a ground classification engine according to some embodiments.

FIG. 3 depicts a block diagram of an example ground classification engine 302 according to some embodiments.

The ground classification engine 302 may be implemented in a computer system that includes at least one processor, memory, and communication interface. The computer system can execute software, such as ground classification software, that performs any number of functions described in relation to FIG. 3.

The ground classification engine 302 includes an ingestion engine 304, a classification engine 306, a feature data engine 308, a formatting engine 310, a training engine 312, and an inference engine 314. The ground classification engine 302 can access a datastore 320.

The ingestion engine 304 may be configured to obtain or receive image data to be processed. The image data can represent a three-dimensional (3D) point cloud. The point cloud may comprise a collection of points in 3D space, as determined by a system (e.g., the scanning system 102) or a sensor (e.g., the imaging apparatus 104). Further, points in the point cloud may each be associated with corresponding attributes, as determined by the system or the sensor, such as three-dimensional Cartesian coordinates (x, y, z), color, intensity, and return number. In other embodiments, the ingestion engine 304 may obtain image data to be processed from the datastore 320. Many variations are possible.

The classification engine 306 may be configured to apply one or more ground classification algorithms to the point cloud. These ground classification techniques may include, but are not limited to, the Simple Morphological Filter (SMRF), Progressive Morphological Filter (PMF), Progressive Triangular Irregular Network (TIN), and Cloth Simulation Filter (CSF). In some embodiments, the classification engine 306 runs each ground classification technique multiple times with different sets of parameters that are optimized for specific types of terrains in order to achieve a high variance in point classifications. In some embodiments, the parameters may be selected so that the different ground classification algorithms generally only work well in isolation for a subset of conditions. For example, the classification engine 306 can run the SMRF algorithm with first parameters optimized for flat terrain, second parameters optimized for hilly terrain, and third parameters optimized for urban terrain. Similarly, the classification engine 306 can run the CSF algorithm with first parameters optimized for flat terrain, second parameters optimized for hilly terrain, and third parameters optimized for urban terrain. Many variations are possible. In general, each conventional ground classification algorithm assigns its own binary classification to every point in the point cloud.

Figure 4A:
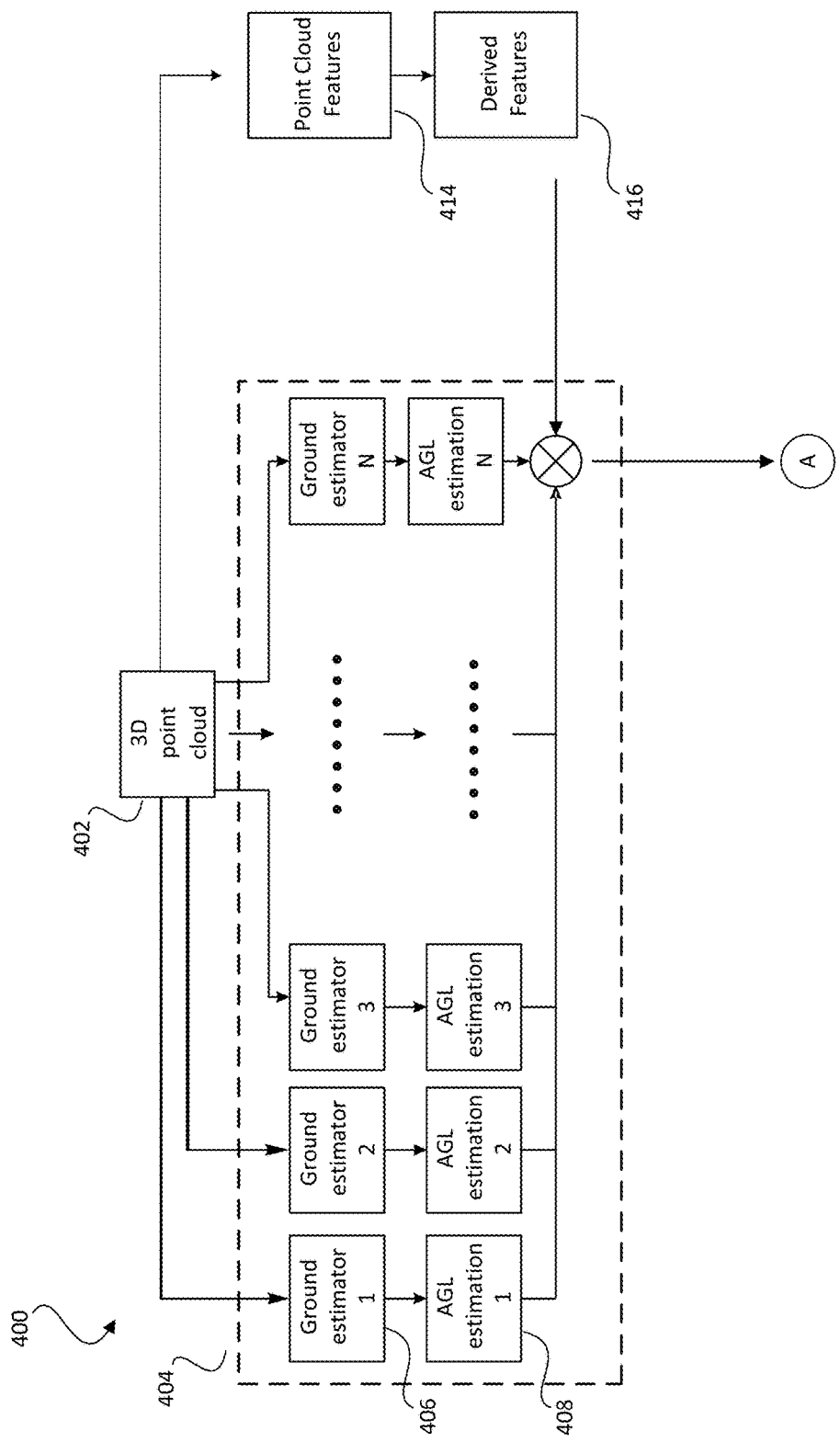
FIG. 4A illustrates an example flowchart for processing point clouds according to some embodiments.

For example, FIG. 4A illustrates an example flowchart 400 for applying ground classification algorithms to the point cloud. The flowchart 400 is provided as an example and may include more or fewer operations (or steps) depending on the embodiment. In the example flowchart 400, the point cloud is obtained at step 402. At step 404, the classification engine 306 can process the point cloud using one or more conventional ground classification algorithms. For example, at step 406, the classification engine 306 may apply the SMRF algorithm to the point cloud based on one or more sets of parameters. The SMRF technique can assign a binary classification to every point in the point cloud. In some embodiments, the classification engine 306 may execute multiple iterations of the SMRF technique on the point cloud using different sets of parameters. The results of each execution of the ground classification algorithm can be stored for use as machine learning features, as described herein.

In step 408, for each ground classification algorithm executed in step 404, the classification engine 306 may determine an estimated above ground level (AGL) for every point in the point cloud. For example, the AGL for a point may be calculated as follows:

$$AGL(P_x, P_y, P_z) = P_z - G_z(P_x, P_y),$$

where P is a point, $P_x$ corresponds to an x coordinate associated with the point, $P_y$ corresponds to a y coordinate associated with the point, $P_z$ corresponds to an z coordinate associated with the point, and where G(x, y) is the nearest ground point. The AGL for a point thus represents a vertical distance of the point relative to its nearest group of points that have been classified as ground.

In various embodiments, metadata associated with images and/or measurements received or retrieved by image sources (e.g., third-party systems that generate images and/or measurement information from satellites, airplanes, cameras, LiDAR devices, and/or the like) may be used to weight ground classification algorithms that are applied by the classification engine 306. For instance, in some embodiments, metadata associated with a point in a point cloud may identify a geographic location that corresponds to the point. In such embodiments, the geographic location may be correlated to a type of terrain, for example, based on an existing topological map of the geographic location. Based on the terrain associated with the geographic location, any ground classifiers that are best suited to identify ground in that terrain may be weighted higher than other ground classifiers that may be applied by the classification engine 306. As a result, outputs from ground classifiers that produce more accurate classifications in that terrain are given greater consideration than other, less accurate ground classifiers. The weights determined for such ground classifiers may be provided as additional features in the machine learning model, which may learn appropriate correlations to improve ground classification accuracy. Many variations are possible. For example, in some embodiments, a table of weights associated with certain types of terrains and ground classification algorithms may be used to determine the weights.

As another example, metadata associated with images and/or measurements that were received or retrieved by image sources may identify equipment (e.g., model, camera type, satellite type, and/or the like) that was used to generate the images and/or measurements. In some cases, the images and/or measurements provided by certain types of equipment may provide information that is better leveraged by some ground classification algorithms over others. For example, the SMRF algorithm may be better at analyzing measurements provided by a certain LiDAR unit than the CSF algorithm. In this example, the SMRF algorithm may be weighted higher than the CSF algorithm. The weights determined for such ground classifiers may be provided as additional features in the machine learning model, which may learn appropriate correlations to improve ground classification accuracy. Many variations are possible. For example, in some embodiments, a table of weights associated with certain types of equipment and ground classification algorithms may be used to determine the weights.

The feature data engine 308 may be configured to extract various features that can be used as inputs to the machine learning model. In various embodiments, the extracted features can include point cloud features, derived features, contextual features, or a combination thereof.

For example, in step 414 of FIG. 4A, the feature data engine 308 may determine point cloud features based on the point cloud. The point cloud features can include, for each point in the point cloud, corresponding point attributes, such as three-dimensional coordinates (e.g., 3D Cartesian coordinates), color (e.g., RGB), intensity, return number, and number of returns. As mentioned, such features may be determined and provided by a system or sensor that captured the point cloud.

In step 416, the feature data engine 308 may derive additional features based on the point cloud. The values derived from the point cloud can include normal, curvature, planarity, zenith angle (or slope), azimuth, and angle, to name some examples.

Figure 4B:
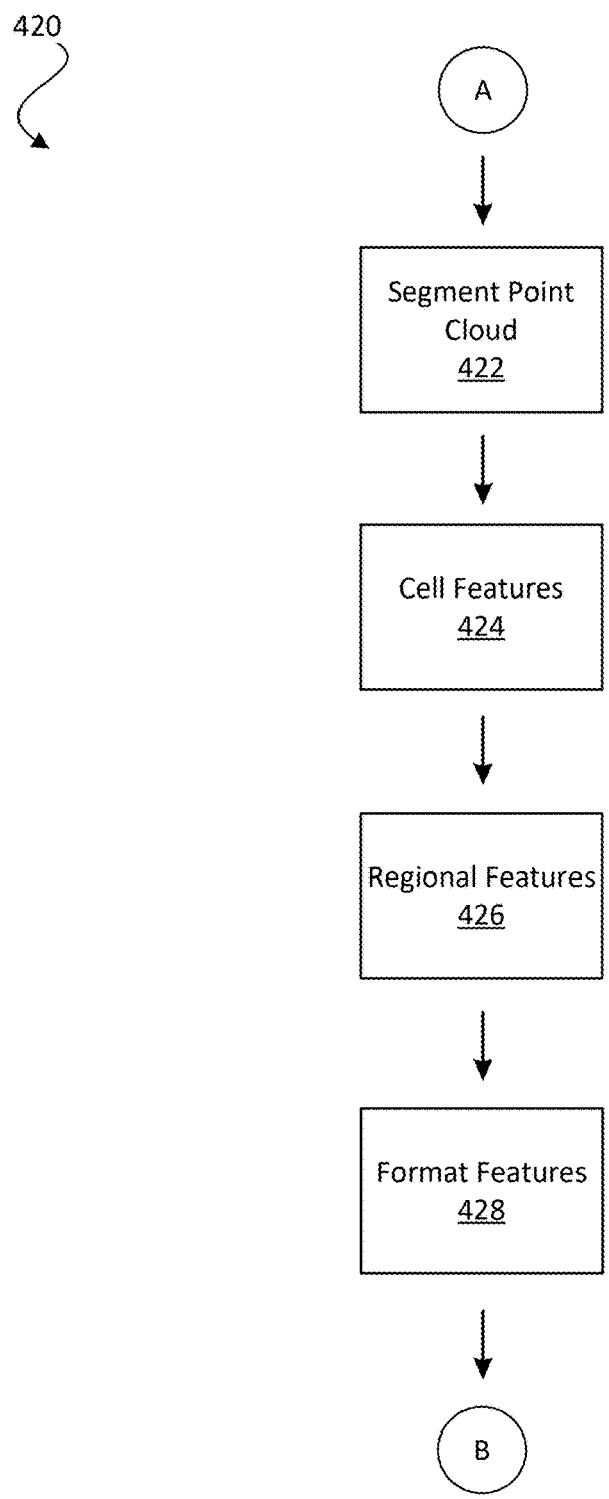
FIG. 4B illustrates an example flowchart for segmenting and processing point clouds according to some embodiments.
Figure 5:
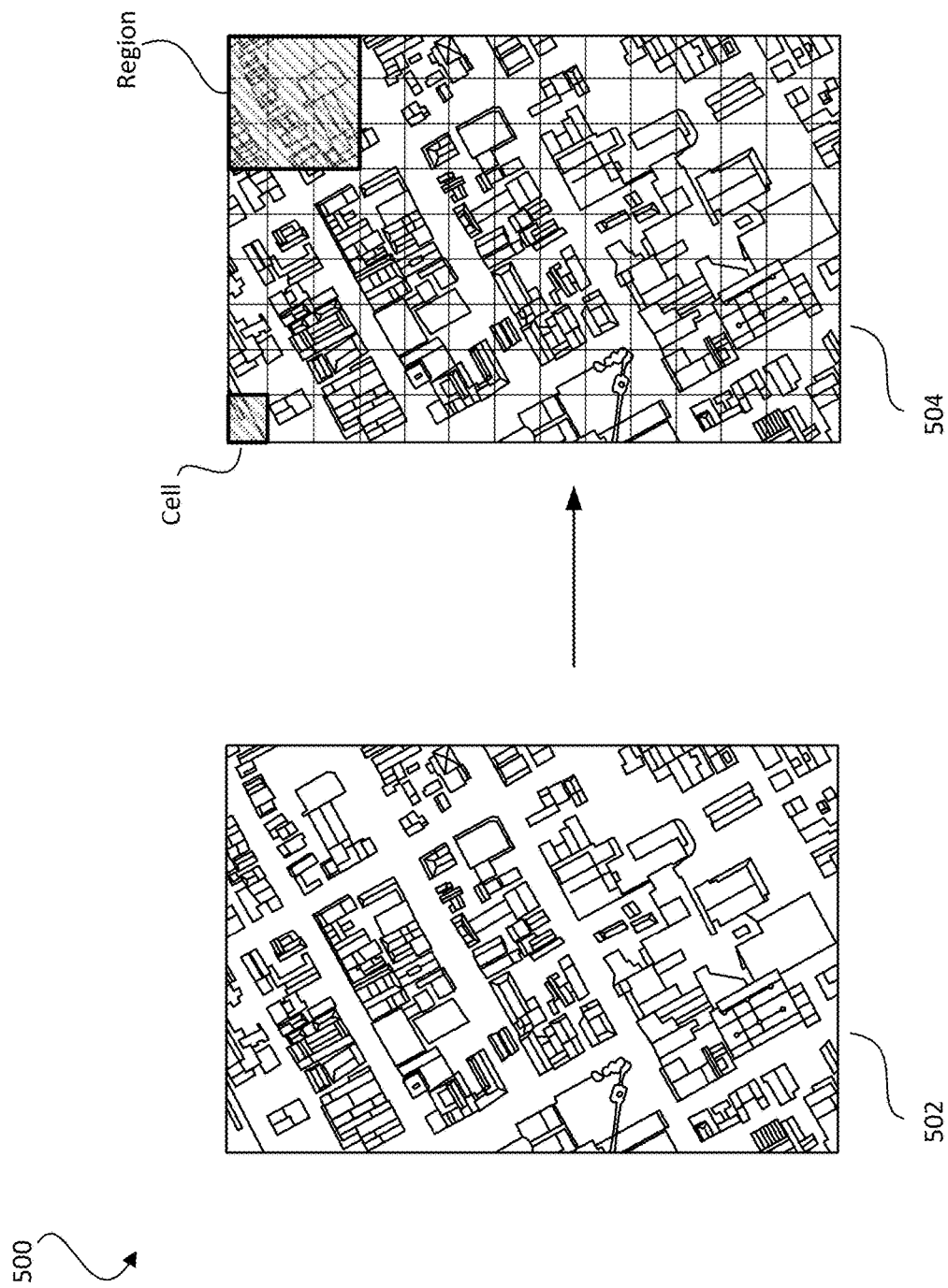
FIG. 5 depicts an example point cloud segmented into a grid of cells according to some embodiments.

The feature data engine 308 may also be configured to determine contextual features from the point cloud. For example, FIG. 4B illustrates an example flowchart 420 for determining contextual features. The flowchart 420 is provided as an example and may include more or fewer operations (or steps) depending on the embodiment. In step 422, the feature data engine 308 spatially segments the point cloud to determine contextual features at varying levels of granularity. According to various embodiments, the feature data engine 308 may divide the point cloud into a grid of cells. For example, as illustrated in the example 500 of FIG. 5, the point cloud 502 (shown in two dimensions) may be divided into a grid 504 of smaller two-dimensional cells along the horizontal X and Y dimensions. In one example, the feature data engine 308 may divide the point cloud into a grid of evenly spaced rectangular cells in the X and Y (easting and northing) dimensions. For example, each cell may be 1×1 meters in size and the cells may be arranged in a 1000×1000 grid covering 1 square kilometer. In other embodiments, the feature data engine 308 may divide the point cloud into an unstructured grid of varying cell sizes and/or shapes. The size and shape of each individual cell could be determined, for example, by its local attributes or through a clustering algorithm, such as an unsupervised clustering algorithm. Many variations are possible.

Once the point cloud has been divided into a grid of cells, in step 424 of FIG. 4B, the feature data engine 308 can determine cell attributes of each cell in the grid of cells. Some examples of cell attributes that may be determined include a minimum z value of a point in a given cell and a maximum z value of a point in the cell; minimum, maximum, and median AGL associated with points included in the cell; a standard deviation of AGL associated with points included in the cell; minimum, maximum, and median intensity of points included in the cell; minimum, maximum, and median curvature associated with points included in the cell; minimum, maximum, and median red, green, blue (RGB) values associated with points included in the cell; minimum, maximum, and median normalized different vegetation index (NDVI); minimum, maximum, median, and standard deviation of zenith angle (or slope) associated with points included in the cell; minimum, maximum, and median SMRF estimated AGL; standard deviation of normals; and minimum, maximum, and median interquartile range (IQR) of vertical z coordinates. Depending on the embodiment, all or any combination of these cell attributes may be determined and used for purposes of training and applying the machine learning model.

In step 426, the feature data engine 308 can also determine regional features for regions (or groups) of cells. For example, the feature data engine 308 may group cells into regions to provide further context of the types of terrains that are represented across a larger geographic area. A region may be defined differently depending on the embodiment, such as a 3×3 grid of cells, 4×4 grid of cells, or 5×5 grid of cells, for example. The feature data engine 308 can evaluate each region of cells to determine corresponding regional features. Some examples of regional features that may be determined include a height in radius R associated with a region of cells; a depth in radius R associated with the region of cells; Z entropy in radius R associated with the region of cells; minimum height of cell below minimum height in some radius (e.g., 10 meter, 15 meter, 20 meter radius); intensity entropy in cell block (e.g., 5×5 cell block, 10×10 cell block, . . . ), and a slope of a cell above a median slope of the point cloud. Depending on the embodiment, all or any combination of these cell attributes may be determined and used for purposes of training and applying the machine learning model.

After the feature data engine 308 has determined the various features described above, in step 428, the formatting engine 310 can organize the features in a compatible format. For example, the formatting engine 310 may be configured to prepare the features in a corresponding format for any type of machine learning model. For example, if the machine learning model is a convolutional neural network (CNN), the features may be formatted as an image with a channel for each feature. In another example, if the machine learning model is a gradient boosted tree classification model, the features may be formatted in a tabular format.

For example, FIG. 6 illustrates example tabular data 600 representing various features determined by the feature data engine 308. In this example, each row 602 of the tabular data 600 corresponds to a cell while each column 604 corresponds to a feature associated with that cell. Many variations are possible. For example, in some embodiments, the features may also include data describing points in each cell. In this example, the data may provide respective attributes of each point included in each cell, such as point coordinates, color, intensity, return number, or number of returns. In such embodiments, a machine learning model trained based on such features can output ground classifications for cells as well as individual ground classifications for points within those cells.

In some instances, the tabular data 600 may be intended for use as a training example for training a machine learning model to classify ground points in a point cloud. In such embodiments, the training engine 312 can store the tabular data 600 as a training example in a training corpus, such as the data store 320. The training engine 312 can also be configured to train machine learning models of various types to classify ground points based on the approaches described herein. For example, the training engine 312 can train a gradient boosted tree classification model based on the tabular data 600. Example model parameters used for the gradient boosted tree classification model can include the CatBoost package; max iterations/trees defined as 1,000; automatic learning rate; an RMSE loss function; and early stopping on f_beta=0.3. Naturally, many variations are possible.

In general, the training engine 312 can train any conventional machine learning algorithm to classify ground points in a point cloud based on the approaches described herein.

Figure 4C:
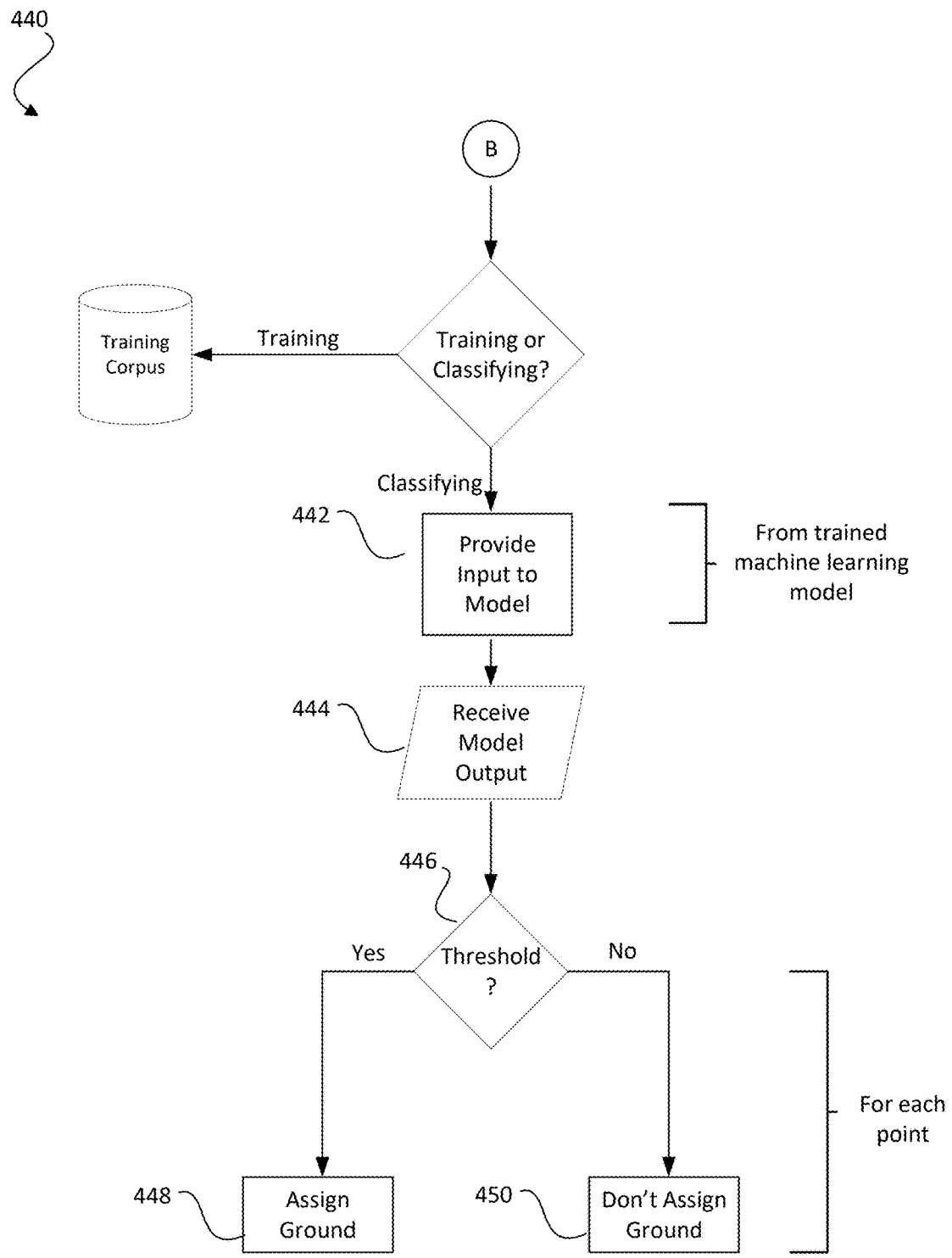
FIG. 4C illustrates an example flowchart for classifying ground points according to some embodiments.

In some instances, the tabular data 600 may be intended for use as input to an already trained machine learning model that can classify ground points based on the approaches described herein. In such embodiments, at step 442 of FIG. 4C, the inference engine 314 can provide the tabular data 600 as input to the trained machine learning model. At step 444, the inference engine 314 can obtain ground classification probabilities outputted by the trained machine learning model for each cell and/or point represented by the tabular data 600. Each cell and/or point is thus associated with a respective probability (or confidence) of corresponding to a ground level associated with the point cloud.

Figure 7A:
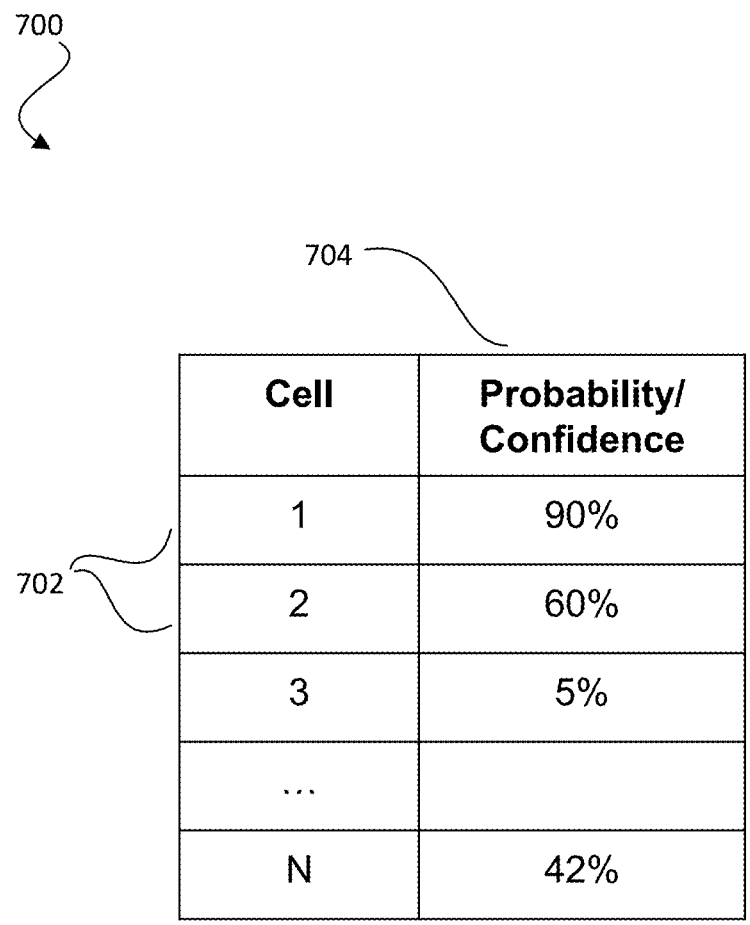
FIGS. 7A-7B depict example outputs from a trained machine learning model according to some embodiments.
Figure 7B:

For example, FIG. 7A illustrates example output 700 from the trained machine learning model. In this example, the output 700 provides respective identifiers 702 associated with cells that represent the point cloud and, for each cell, a corresponding probability (or confidence level) 704 that the cell corresponds to ground. In another example, FIG. 7B illustrates example output 720 from the trained machine learning model. In this example, the output 720 provides, for each point, a respective point identifier 722 identifying a point in the point cloud, a cell identifier 724 identifying a cell in which the point is located, and a corresponding probability (or confidence level) 726 that the point corresponds to ground. Many variations are possible.

The inference engine 314 can be configured to label points in the point cloud as ground or not ground. In various embodiments, the inference engine 314 can label points based on a comparison between their predicted ground probabilities and a threshold probability.

For example, at step 446, the inference engine 314 can evaluate a point based on its probability of corresponding to ground level, as outputted by the trained machine learning model. The inference engine 314 can determine whether that probability satisfies the threshold probability. If the inference engine 314 determines that the probability satisfies the threshold probability, at step 448, the inference engine 314 labels the point as a ground point. Otherwise, if the inference engine 314 determines that the probability does not satisfy the threshold probability, at step 450, the inference engine 314 labels the point as a non-ground point. Many variations are possible. The inference engine 314 may continue evaluating and labeling each point in the point cloud based on the threshold probability. The threshold probability can vary depending on the embodiment. For example, the threshold probability may be 50 percent, 60 percent, or 70 percent depending on the implementation.

Although the examples provided above specifically reference geographic regions, the embodiments described herein may be applied to any point cloud data regardless of whether that point cloud data represents an exterior environment or an interior environment. For example, the techniques described herein may be adapted to analyze a 3D point cloud of a building interior. In this example, a machine learning model can be trained to analyze the point cloud of the build interior to estimate points that correspond to a floor of the building.

Figure 8A:
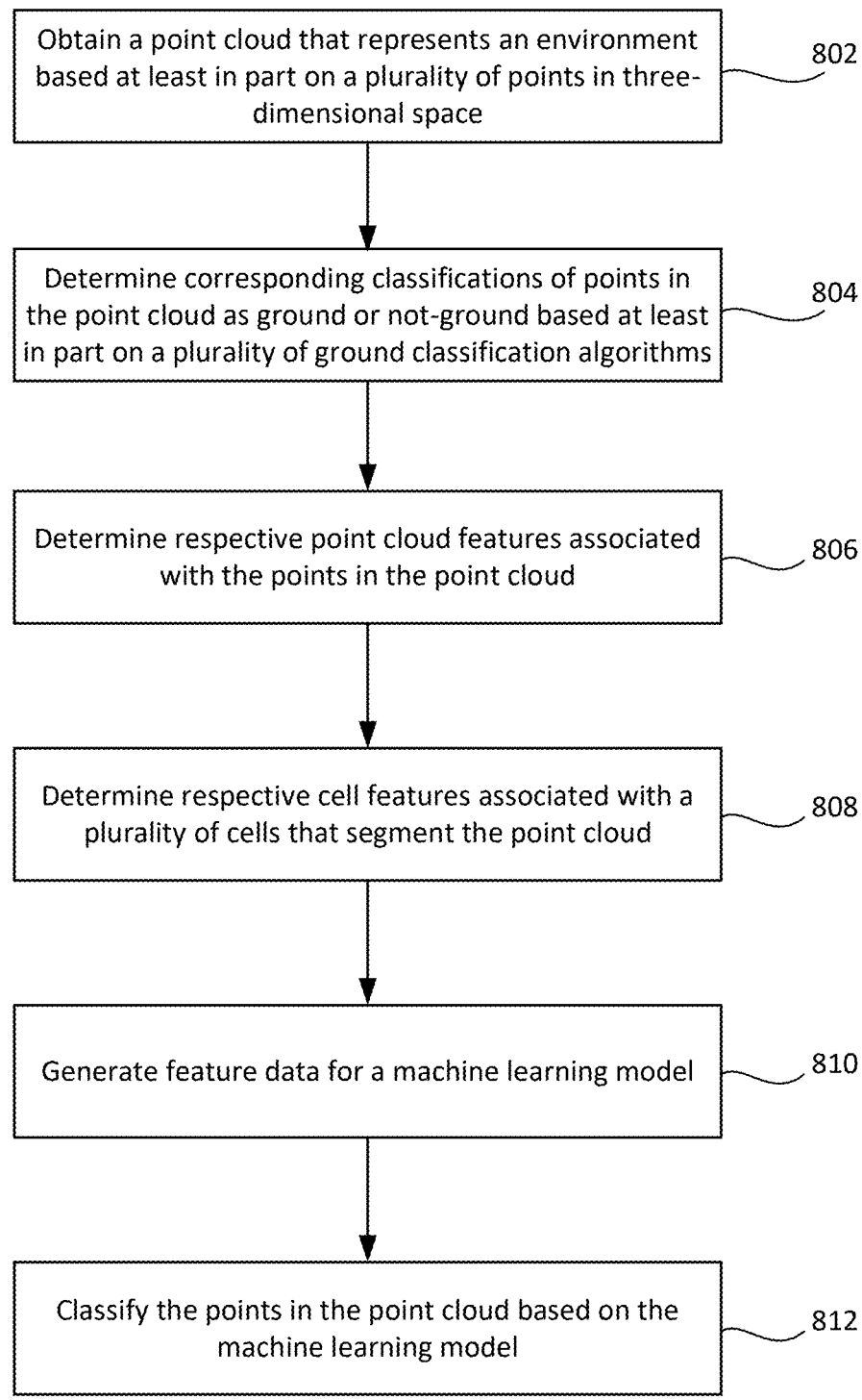
FIG. 8A illustrates an example process for ground classification according to some embodiments.

FIG. 8A illustrates an example process for ground classification according to some embodiments. In step 802, a point cloud that represents an environment based at least in part on a plurality of points in three-dimensional space is obtained. The point cloud may be obtained from a system or a sensor, as described herein. In step 804, corresponding classifications of points in the point cloud as ground or not-ground may be determined based at least in part on a plurality of ground classification algorithms. In step 806, respective point cloud features associated with the points in the point cloud may be determined. In step 808, respective cell features associated with a plurality of cells that segment the point cloud may be determined. In step 810, feature data for a machine learning model may be generated based at least in part on one or more of: the classifications of the points based on the plurality of ground classification algorithms, the point cloud features, or the cell features. In step 812, the points in the point cloud may be classified based at least in part on an output from the machine learning model in response to input of at least the feature data. Many variations are possible, as described herein.

Figure 8B:
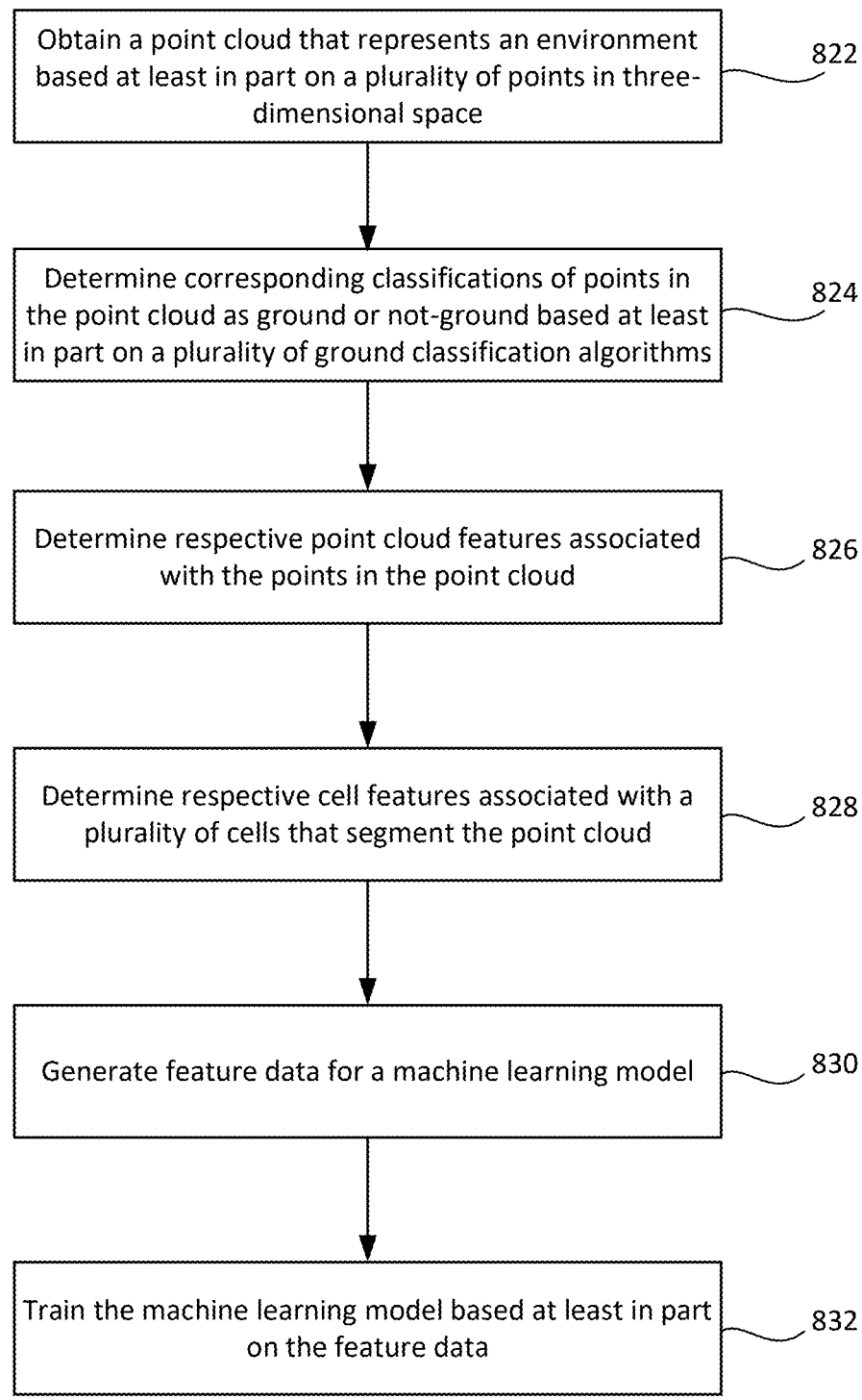
FIG. 8B illustrates an example process for training a machine learning model according to some embodiments.

FIG. 8B illustrates an example process for training a machine learning model according to some embodiments. In step 822, a point cloud that represents an environment based at least in part on a plurality of points in three-dimensional space is obtained. The point cloud may be obtained from a system or a sensor, as described herein. In step 824, corresponding classifications of points in the point cloud as ground or not-ground may be determined based at least in part on a plurality of ground classification algorithms. In step 826, respective point cloud features associated with the points in the point cloud may be determined. In step 828, respective cell features associated with a plurality of cells that segment the point cloud may be determined. In step 830, feature data for a machine learning model may be generated based at least in part on one or more of: the classifications of the points based on the plurality of ground classification algorithms, the point cloud features, or the cell features. In step 832, the machine learning model may be trained based at least in part on the feature data. Many variations are possible, as described herein.

Figure 9:
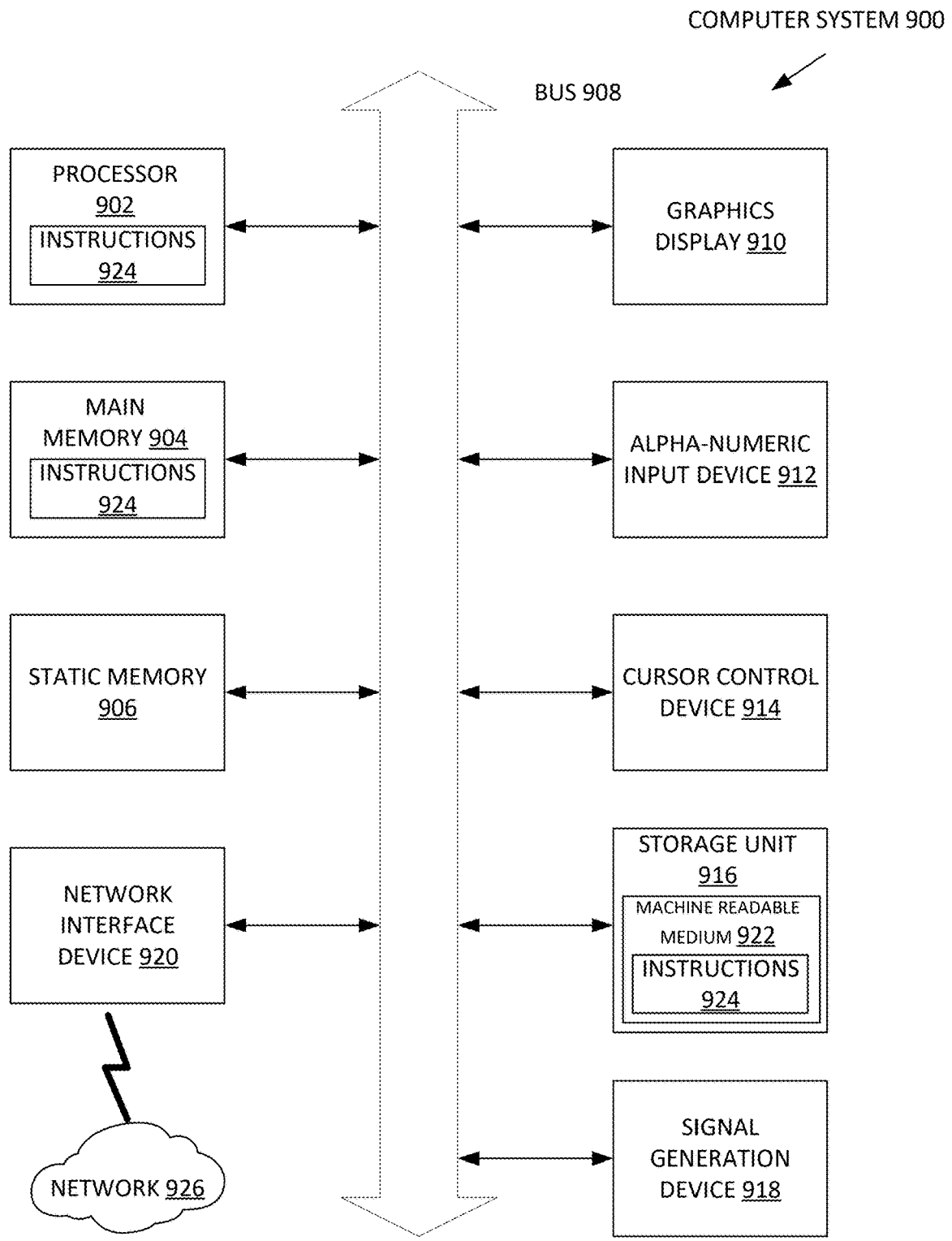
FIG. 9 is a block diagram illustrating a computing device in one example.

FIG. 9 is a block diagram illustrating a digital device in one example. The digital device may read instructions from a machine-readable medium and execute those instructions by a processor to perform the machine processing tasks discussed herein, such as the engine operations discussed above. Specifically, FIG. 9 shows a diagrammatic representation of a machine in the example form of a computer system 900 within which instructions 924 (e.g., software) for causing the machine to perform any one or more of the methodologies discussed herein may be executed. In alternative embodiments, the machine operates as a standalone device or may be connected (e.g., networked) to other machines, for instance, via the Internet. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 924 (sequential or otherwise) that specify actions to be taken by that machine. Further, while only a single machine is illustrated, the term "machine" shall also be taken to include any collection of machines that individually or jointly execute instructions 924 to perform any one or more of the methodologies discussed herein.

The example computer system 900 includes a processor 902 (e.g., a central processing unit (CPU), a graphics processing unit (GPU), a digital signal processor (DSP), one or more application-specific integrated circuits (ASICs), one or more radio-frequency integrated circuits (RFICs), or any combination of these), a main memory 904, and a static memory 906, which are configured to communicate with each other via a bus 908. The computer system 900 may further include a graphics display unit 910 (e.g., a plasma display panel (PDP), a liquid crystal display (LCD), a projector, or a cathode ray tube (CRT)). The computer system 900 may also include alphanumeric input device 912 (e.g., a keyboard), a cursor control device 914 (e.g., a mouse, a trackball, a joystick, a motion sensor, or other pointing instrument), a data store 916, a signal generation device 918 (e.g., a speaker), and a network interface device 920, which also is configured to communicate via the bus 908.

The data store 916 includes a machine-readable medium 922 on which is stored instructions 924 (e.g., software) embodying any one or more of the methodologies or functions described herein. The instructions 924 (e.g., software) may also reside, completely or at least partially, within the main memory 904 or within the processor 902 (e.g., within a processor's cache memory) during execution thereof by the computer system 900, the main memory 904 and the processor 902 also constituting machine-readable media. The instructions 924 (e.g., software) may be transmitted or received over a network 926 via network interface 920.

While machine-readable medium 922 is shown in an example embodiment to be a single medium, the term "machine-readable medium" should be taken to include a single medium or multiple media (e.g., a centralized or distributed database, or associated caches and servers) able to store instructions (e.g., instructions 924). The term "machine-readable medium" shall also be taken to include any medium that is capable of storing instructions (e.g., instructions 924) for execution by the machine and that cause the machine to perform any one or more of the methodologies disclosed herein. The term "machine-readable medium" includes, but should not be limited to, data repositories in the form of solid-state memories, optical media, and magnetic media.

In this description, the term "engine" refers to computational logic for providing the specified functionality. An engine can be implemented in hardware, firmware, and/or software. Where the engines described herein are implemented as software, the engine can be implemented as a standalone program, but can also be implemented through other means, for example as part of a larger program, as any number of separate programs, or as one or more statically or dynamically linked libraries. It will be understood that the named engines described herein represent one embodiment, and other embodiments may include other engines. In addition, other embodiments may lack engines described herein and/or distribute the described functionality among the engines in a different manner. Additionally, the functionalities attributed to more than one engine can be incorporated into a single engine. In an embodiment where the engines as implemented by software, they are stored on a computer readable persistent storage device (e.g., hard disk), loaded into the memory, and executed by one or more processors as described above in connection with FIG. 9. Alternatively, hardware or software engines may be stored elsewhere within a computing system.

As referenced herein, a computer or computing system includes hardware elements used for the operations described here regardless of specific reference in FIG. 9 to such elements, including, for example, one or more processors, high-speed memory, hard disk storage and backup, network interfaces and protocols, input devices for data entry, and output devices for display, printing, or other presentations of data. Numerous variations from the system architecture specified herein are possible. The entities of such systems and their respective functionalities can be combined or redistributed.

The invention claimed is:

1. A computer-implemented method comprising:
    obtaining a point cloud that represents an environment based at least in part on a plurality of points in three-dimensional space;
    determining corresponding classifications of points in the point cloud as ground or not-ground based at least in part on a plurality of ground classification algorithms;
    determining respective point cloud features associated with the points in the point cloud;
    determining respective cell features associated with a plurality of cells that segment the point cloud;
    generating feature data for a machine learning model based on at least two of: the classifications of the points based on the plurality of ground classification algorithms, the point cloud features, or the cell features; and
    classifying the points in the point cloud based at least in part on an output from the machine learning model in response to input of the feature data.

2. The computer-implemented method of claim 1, wherein determining the respective point cloud features comprises:
    determining attributes for each point, the attributes including at least one of: coordinates of the point in three-dimensional space, a color associated with the point, an intensity associated with the point, or an estimated above ground level (AGL) associated with the point.

3. The computer-implemented method of claim 1, wherein the output from the machine learning model further comprises respective ground classification probabilities for the points in the point cloud, wherein a ground classification probability for a point represents a likelihood of that point corresponding to a ground level in the environment.

4. The computer-implemented method of claim 3, wherein the attributes determined for the cell comprise one or more of: a minimum z value of a point in the cell or a maximum z value of a point in the cell; a minimum, maximum, or median AGL associated with points included in the cell; a standard deviation of AGL associated with points included in the cell; a minimum, maximum, or median intensity of points included in the cell; a minimum, maximum, or median curvature associated with points included in the cell; a minimum, maximum, or median red, green, blue (RGB) values associated with points included in the cell; a minimum, maximum, or median normalized different vegetation index (NDVI); a minimum, maximum, median, or standard deviation of zenith angle (or slope) associated with points included in the cell; a minimum, maximum, or median simple morphological filter (SMRF) estimated AGL; a standard deviation of normals; a minimum, maximum, or median interquartile range (IQR) of vertical z coordinates, or a combination thereof.

5. The computer-implemented method of claim 1, wherein the plurality of points in three-dimensional space is determined by a sensor device.

6. The computer-implemented method of claim 1, wherein determining the respective cell features associated with the plurality of cells comprises:
    dividing the point cloud into a two-dimensional grid of cells along horizontal X and Y dimensions, wherein a cell corresponds to a portion of the environment as represented by the point cloud; and
    determining one or more attributes for each cell, wherein the one or more attributes are representative of points included in the cell.

7. The computer-implemented method of claim 1, further comprising:
    determining respective regional features associated with a plurality of regions of cells that represent the environment, wherein a region of cells comprises a plurality of cells.

8. The computer-implemented method of claim 7, wherein determining the respective regional features associated with the plurality of regions of cells that represent the environment comprises:
grouping cells in the plurality of cells into the plurality of regions of cells; and
determining one or more attributes for each region of cells, wherein the one or more attributes are representative of a plurality of cells and points included in the region of cells.

9. The computer-implemented method of claim 8, wherein the attributes determined for the region of cells comprise one or more of: a height in radius R associated with the region of cells; a depth in radius R associated with the region of cells; a Z entropy in radius R associated with the region of cells; a minimum height of cell below minimum height in some radius associated with the region of cells; an intensity entropy in the region of cells, a slope of a cell in the region of cells that is above a median slope of the point cloud, or a combination thereof.

10. The computer-implemented method of claim 1, wherein generating the feature data for the machine learning model comprises:
formatting the feature data for ingestion by the machine learning model.

11. A system comprising at least one processor and memory storing instructions that cause the system to perform:
obtaining a point cloud that represents an environment based at least in part on a plurality of points in three-dimensional space;
determining corresponding classifications of points in the point cloud as ground or not-ground based at least in part on a plurality of ground classification algorithms;
determining respective point cloud features associated with the points in the point cloud;
determining respective cell features associated with a plurality of cells that segment the point cloud;
generating feature data for a machine learning model based at least on two of: the classifications of the points based on the plurality of ground classification algorithms, the point cloud features, or the cell features; and
classifying the points in the point cloud based at least in part on an output from the machine learning model in response to input of the feature data.

12. The system of claim 11, wherein determining the respective point cloud features causes the system to perform:
determining attributes for each point, the attributes including at least one of: coordinates of the point in three-dimensional space, a color associated with the point, an intensity associated with the point, or an estimated above ground level (AGL) associated with the point.

13. The system of claim 11, wherein the output from the machine learning model further comprises respective ground classification probabilities for the points in the point cloud, wherein a ground classification probability for a point represents a likelihood of that point corresponding to a ground level in the environment.

14. The system of claim 13, wherein the plurality of points in three-dimensional space is determined by a sensor device.

15. The system of claim 11, wherein determining the respective cell features associated with the plurality of cells causes the system to perform:
dividing the point cloud into a two-dimensional grid of cells along horizontal X and Y dimensions, wherein a cell corresponds to a portion of the environment as represented by the point cloud; and
determining one or more attributes for each cell, wherein the one or more attributes are representative of points included in the cell.

16. A system comprising at least one processor and memory storing instructions that cause the system to perform:
obtaining a point cloud that represents an environment based at least in part on a plurality of points in three-dimensional space;
determining corresponding classifications of points in the point cloud as ground or not-ground based at least in part on a plurality of ground classification algorithms;
determining respective point cloud features associated with the points in the point cloud;
determining respective cell features associated with a plurality of cells that segment the point cloud;
generating feature data for a machine learning model based on at least two of: the classifications of the points based on the plurality of ground classification algorithms, the point cloud features, or the cell features; and
training the machine learning model based at least in part on the feature data.

17. The system of claim 16, wherein the plurality of points in three-dimensional space is determined by a sensor device.

18. The system of claim 16, wherein the feature data further comprises ground truth information for the points in the point cloud, wherein the ground truth information correctly classifies the points in the point cloud as ground or not-ground.

19. The system of claim 18, wherein the instructions further cause the at least one processor to perform:
storing the feature data as a training example in a training data repository.

20. The system of claim 16, wherein the instructions further cause the at least one processor to perform:
determining respective regional features associated with a plurality of regions of cells that represent the environment, wherein a region of cells comprises a plurality of cells.

* * * * *